United States Patent [19]

Welburn

[11] Patent Number: 4,501,980
[45] Date of Patent: Feb. 26, 1985

[54] HIGH TORQUE ROBOT MOTOR

[75] Inventor: Ross D. Welburn, Santa Rosa, Calif.

[73] Assignee: Motornetics Corporation, Santa Rosa, Calif.

[21] Appl. No.: 385,034

[22] Filed: Jun. 4, 1982

[51] Int. Cl.³ .............................................. H02K 37/00
[52] U.S. Cl. .................................... 310/12; 310/49 R; 310/266; 310/14; 318/135
[58] Field of Search ....... 310/49, 12, 14, 266; 318/138

[56] References Cited

U.S. PATENT DOCUMENTS

| | | |
|---|---|---|
| 2,627,040 | 1/1953 | Hansen . |
| 3,162,796 | 12/1964 | Schreiber et al. . |
| 3,292,065 | 12/1966 | Fredrickson . |
| 3,629,626 | 12/1971 | Abbott . |
| 3,867,676 | 2/1975 | Chai et al. . |
| 4,029,977 | 6/1977 | Chai et al. . |
| 4,035,680 | 7/1977 | Maeder . |
| 4,070,592 | 1/1978 | Snowdon . |
| 4,286,180 | 8/1981 | Langley ............................ 310/49 X |
| 4,288,709 | 9/1981 | Matthias et al. ................ 310/266 X |

FOREIGN PATENT DOCUMENTS 1469257  1/1966  France .
50-29211  7/1973  Japan .

OTHER PUBLICATIONS

*IBM Tech Disclosure Bulleton*, "Linear Incremental Motor", Thompson, vol. 6, No. 9.

Primary Examiner—Donovan F. Duggan
Attorney, Agent, or Firm—Philip M. Shaw, Jr.

[57] ABSTRACT

An electric motor comprised of laminated, coaxial, annular, inner and outer stators with an annular rotor coaxially positioned between the stators and with coils wrapped about corresponding, angularly spaced apart pole pieces of the inner and outer stators to generate a magnetic flux path which passes radially outward and inward through the rotor from the inner and outer stator pole pieces.

9 Claims, 5 Drawing Figures

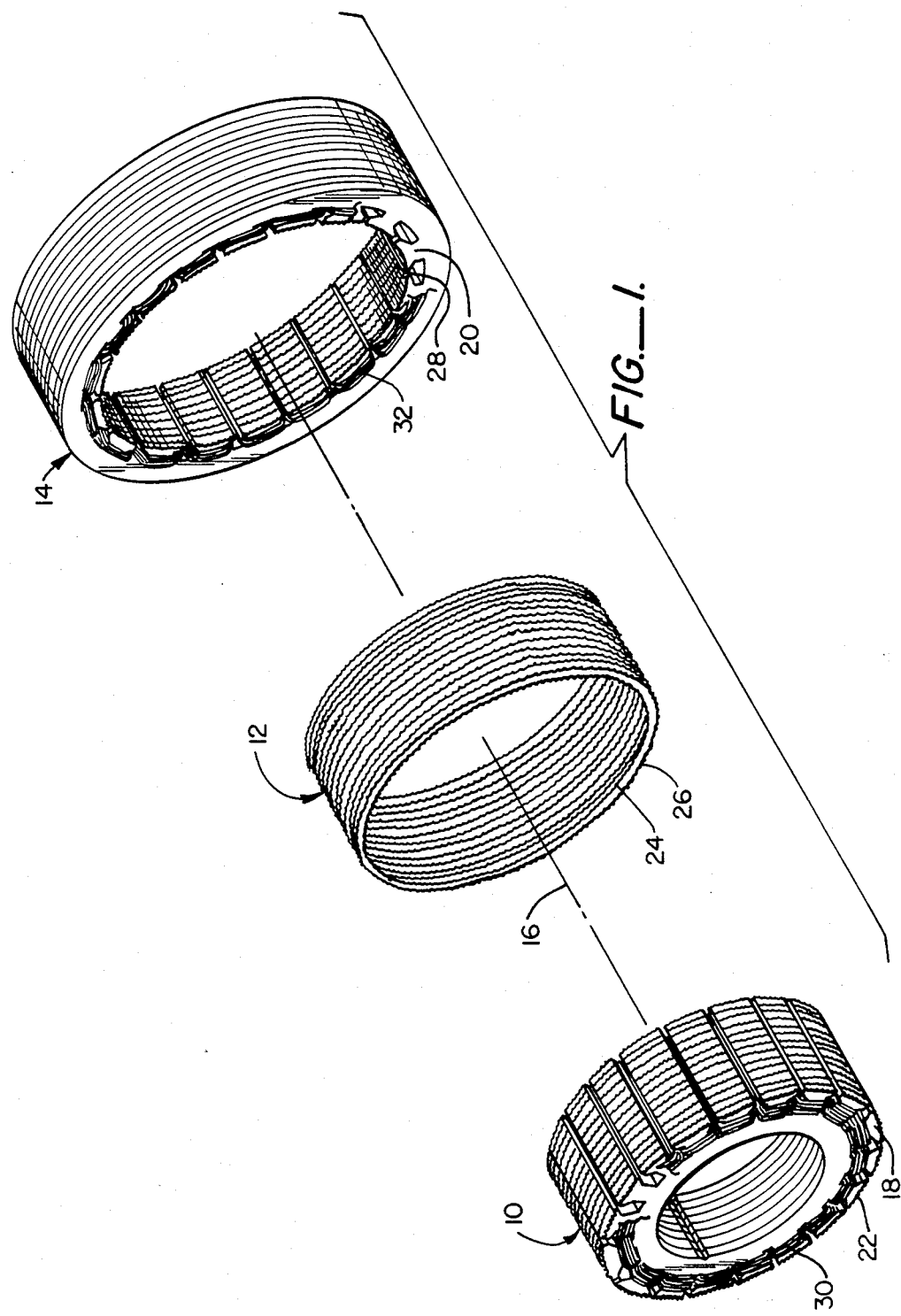
FIG.__1.

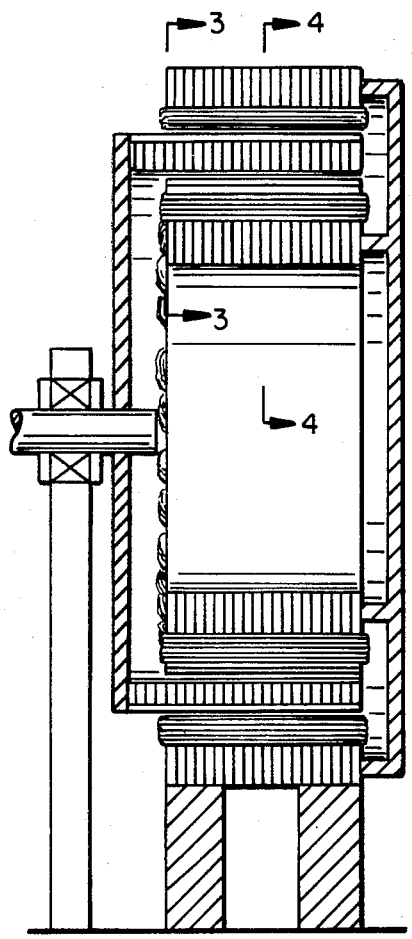
FIG._2.
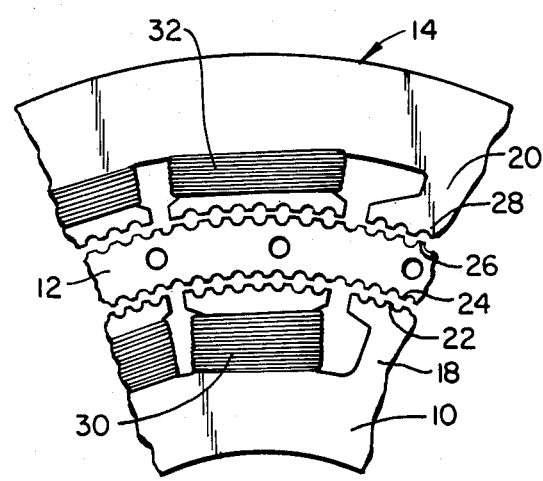
FIG._3.
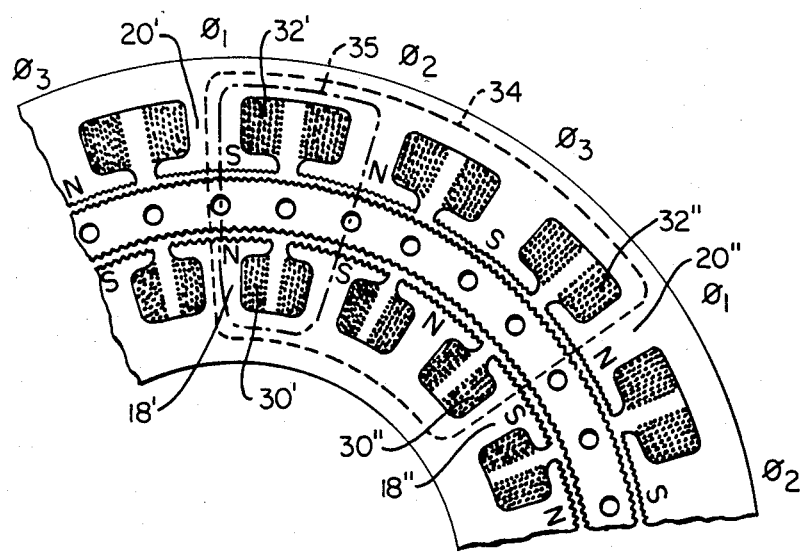
FIG._4.

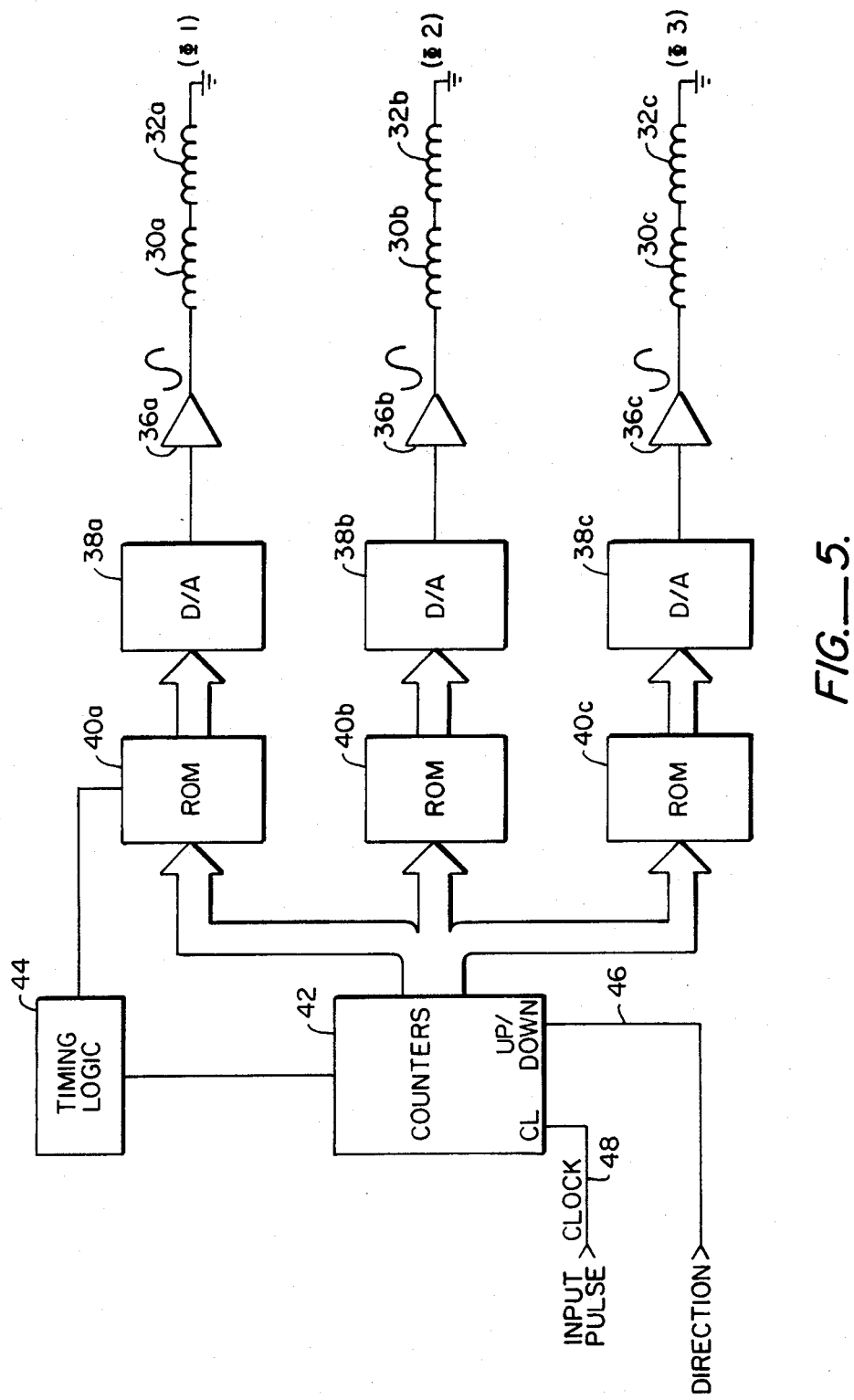
FIG._5.

HIGH TORQUE ROBOT MOTOR

BACKGROUND OF THE INVENTION

This invention relates to an electrical motor and, more particularly, to a reluctance stepper motor which is operated as a synchronous motor in the microstep mode.

In some industrial applications, it is desirable to have a very high torque motor for directly driving loads, such as in industrial robots, for example. A high torque motor placed in each joint of a robot, for instance, eliminates gears or other mechanisms that have backlash. Backlash in servo systems causes dead zones, servo oscillations, and increases the wear, noise and cost and reduces the reliability of such servo systems.

Prior such reluctance stepper motors with or without a permanent magnet have not provided sufficient torque for their size and weight compared to the present invention. This has been due to a number of problems, including the fact that in reluctance type stepper motors, the magnetic flux path passes circumferentially through the rotor, thereby requiring a thicker, more massive rotor.

Furthermore, the magnetic flux path in some prior art stepper motors passes through unintended stator poles causing a reduction in the torque as well as instability in the driving amplifiers for the motor. This occurs because if an amplifier is driving one phase that is turned off, but is coupled magnetically, like a transformer, to an energized phase, an oscillation will occur between the two amplifiers, that is, between the amplifier which is actually driving one phase and the other amplifier which has been turned off. Basically, the off or reduced current driving amplifier is being misinformed about winding current and tries to correct the situation by changing the amplifier's own current away from a zero value.

Still another problem with some prior art motors of this type is that they are polarity sensitive, that is they require bipolar amplifiers to drive them in one direction or another.

Still a further problem, particularly in servo systems, is that some prior art reluctance type stepper motors have a detent torque when the power is turned off to the motor. This residual torque prevents freewheeling of the motor which is a problem in some applications such as balanced robot arms that are manually guided by the operator.

SUMMARY OF THE INVENTION

The foregoing problems of prior art reluctance stepper motors are overcome by the present invention of an electric motor which is comprised of an inner stator, outer stator, and an annular rotor, which is co-axially positioned between the inner and outer stators about an axis of revolution. The stators and the rotor are each provided with sets of teeth, all of which are intersected by a hypothetical plane which is perpendicular to the axis of revolution and with the stator teeth being opposed to the rotor teeth. These two sets of rotor teeth reacting with the two stators, teeth, combined with the improved flux paths enabled by a thin ring rotor and the distributed windings, produce many times the torque per weight of the motor. The motor further includes coil means which encircle portions of the inner and outer stators for selectively generating a magnetic flux in the stators and the rotor, which flux follows a circular path through the inner stator, radially outward through the rotor, circumferentially through the outer stator, and radially inward through the rotor to return to the inner stator. The coil means generates the magnetic flux in such a way that the flux passes radially outward and inward through different sets of teeth of the stators and the rotor.

The rotor and the stators are each made of laminations. Each of the stators is comprised of a plurality of separate pole pieces arranged at regular angular intervals about the axis of revolution and with the pole pieces of the inner stator being aligned with corresponding pole pieces of the outer stator. The coil means is comprised of a plurality of electrical coils, each coil being wound on a separate one of the pole pieces and with the coils which are wrapped about the corresponding pole pieces of the inner and outer stators being connected in series so that when electrical current is applied to the coils, magnetic poles of opposite polarity are presented to the opposite sides of that portion of the rotor which passes between the two opposing poles of the inner and outer stators.

The coil means sequentially generates magnetic flux in predetermined sets of the pole pieces in phases, that is, for example, the coils surrounding a first pole piece and every third pole piece thereafter of the inner and outer stators are simultaneously energized by the coil means for a three-phase motor. Naturally, the sets of coils corresponding to each phase are energized in a rotary succession in order to cause the rotor to follow the rotating magnetic field. When operating in a microstep mode, the coils of adjacent stator pole pieces are simultantously energized, but in different magnitudes and to produce opposite magnetic polarities. These two sets of rotor teeth reacting with the stator teeth produce, when combined with the improved flux paths enabled by the thin ring rotor and the distributed windings many times the torque per pound of the conventional motor. Thus, by reducing the current in the coils of one phase in discrete steps, while simultaneously increasing the current in the coils of another phase in discrete steps, the resolution or effective steps per revolution can be discretely controlled and is typically 108,000 steps per revolution. This resolution is a function of the number of teeth on the stator pole pieces and on the rotor; whithin limits, the greater the number of teeth, the higher the resolution and torque of the motor. The motor must have the proper design of the tooth to valley ratio and the correct phase winding current to produce sufficient torque in all of the new angular positions that microstepping permits.

It is therefore an object of the present invention to provide a reluctance stepper motor that has very high torque.

It is still another object of the invention to provide a reluctance stepper motor which is low in cost.

It is yet another object of the invention to provide a reluctance stepper motor for directly driving loads such as in a robot arm.

It is a further object of the invention to provide a motor which has a low inertia rotor.

It is a further object of the invention to provide a reluctance stepper motor which has a high torque to size and weight ratio.

It is a further object of this invention to provide a motor with no detent or residual torque so it is freewheeling with power off.

It is yet a further object of the invention to provide a reluctance stepper motor which may be operated in a microstep mode with no torque dropouts.

It is a further object of the invention to provide a stepper motor which can be driven by unipolar driving means.

The novel features which are believed to be characteristic of the invention, both as to organization and method of operation, together with further advantages thereof, will be better understood from the following drawings, in which several preferred embodiments of the invention are illustrated by way of example.

BRIEF DESCRIPTION OF THE DRAWINGS

FIG. 1 is an exploded, perspective view, of the rotor and stator assembly of the motor according to the invention;

FIG. 2 is an elevational, side view, in section of the assembled motor of the invention;

FIG. 3 is an enlarged, elevational view, taken generally along the lines 3—3 in FIG. 2;

FIG. 4 is a diagrammatic illustration of the phase winding arrangement of the motor; and FIG. 5 is a block diagram of the motor's electronic drive circuitry.

DETAILED DESCRIPTION OF CERTAIN PREFERRED EMBODIMENTS OF THE INVENTION

Referring now more particularly to FIGS. 1 and 3, the motor of the present invention is comprised of an inner stator assembly 10, a rotor 12, and an outer stator assembly 14. The rotor 12 is co-axially positioned between the inner stator assembly 10 and the outer stator assembly 14 about a hypothetical axis of rotation 16. Each of the structures 10, 12, and 14 is made up of separate laminations of soft iron.

As best illustrated in FIGS. 1 and 3, each of the inner and outer stators is provided with a plurality of pole pieces 18 and 20, respectively, which are arranged at regular, angular intervals about the axis of revolution 16. The inner stator pole pieces 18 are aligned with the corresponding outer stator pole pieces 20. Each of the pole pieces 18 is provided with pole piece teeth 22 and each of the pole pieces 20 is likewise provided with pole piece teeth 28. The rotor 12 is provided with two sets of teeth 24 and 26 which are opposed to the pole piece teeth 22 and 28, respectively. All of the teeth 22-28 are intersected by a hypothetical plane which is perpendicular to the axis of revolution 16.

A separate electrical coil 30 surrounds each pole piece 18 of the inner stator and a separate electrical coil 32 surrounds each pole piece 20 of the outer stator. The coils 30 and 32 of the opposed pole pieces 18 and 20 are electrically connected in series so that when an electric current is passed through the coils, a magnetic field will be generated across the portion of the rotor 12 between the poles 18 and 20. The stator pole 18 will have a magnetic polarity which is opposite to that of the opposed stator pole 20.

As shown more clearly in FIG. 4, when the coils surrounding a first stator pole and every third stator pole thereafter are energized, that is coils 30', 32', 32", and 30", a magnetic flux path 34 is generated. This path 34 travels from the inner stator pole 18', across that portion of the rotor 12 between the stator poles 18' and 20' and through the stator pole 20'. The path 34 continues on through the outer stator 14 along its circumference, past two unenergized windings, and back through the other stator pole 20", through the rotor 12, and through the inner stator pole 18", to return along the inner stator to the original inner stator pole 18', thereby completing the closed loop.

The important concept is that no flux travels through the rotor in a circumferential direction to take a short cut to the next stator pole. Instead, all of the magnetic flux travels through the rotor 12 in a radially outward or radially inward direction. If one of the aligned stator poles 18' or 20' were not there or were not energized, the magnetic flux would have to return through the rotor, in a circumferential direction. The rotor 12 in such case would have to be thicker and would have less than half the torque, because only half of its teeth would be magnetically engaged and because of the improved flux paths.

Six identical flux paths are created for a three-phase motor at any one time. This means that a first and every third set of stator coils thereafter is simultaneously energized. For the eighteen pole motor depicted in the figures this means that, at any given time, six coil assemblies are simultaneously energized. In other words, if one were to number all the stator pole positions with sequential numbers of 1 to 18, the stator poles at the first, fourth, seventh, tenth, thirteenth, and sixteenth positions would all be simultaneously energized at the same time. Immediately thereafter, all of the stator pole pieces at the second, eighth, eleventh, fourteenth, and seventeenth positions would be simultaneously energized, and so on as the rotor is rotated through each of the three phases.

The rotative force for the rotor is derived from the fact that the teeth on each succeeding stator pole piece set are slightly out of alignment with the opposed teeth of the rotor due to the spacing between the adjacent stator pole pieces. Thus, for example, when the pole pieces of the first phase are energized, the teeth on the rotor which reside between the energized pole pieces will be forced to fall into alignment with the teeth on the energized stator pole pieces. At this time, the teeth on the portion of the rotor which is positioned between the next adjacent, unenergized pole pieces, will not be in alignment with the stator teeth because the pole pieces are spaced apart by a distance which is not an integral multiple of the teeth spacing.

Furthermore, the difference between the number of outer stator teeth and the number of rotor teeth which face the outer stator teeth is equal to the number of outer stator poles divided by the number of phases. This is also true of the rotor teeth which face the inner stator pole piece teeth. For example, for an 18 pole, 3 phase motor, if the stator poles each have 8 teeth (144 total for the outer stator, 144 total for the inner stator) the rotor will have a total of 150 teeth facing the inner stator teeth and 150 teeth facing the outer stator teeth. All that is required is that the pitch of the rotor teeth be different from the pitch of the stator teeth. As power is supplied to the coils of each succeeding phase, the rotor will be caused to move to place the rotor teeth into alignment with the stator teeth in each succeeding phase and, thus, the rotor will rotate in the same direction in which power is successively supplied to each of the phases of the motor.

For robot arm applications, the magnetic step angle of the motor must be an even multiple of 360 for a radial turn style or robot arm applications. Other applications may require round numbers divisible by 5, such as for turning lead screws because of the common five turns per inch screw standard. In the above given example, the rotor has 150 teeth, while each stator has 144 teeth. 150 rotor teeth times 3 phases makes this a 450 magnetic step per revolution motor, which is an even multiplicand of 3600.

These and further preferred combinations for three phase motors are set forth in the following table:

| Inner/Outer Poles | Teeth/Pole | Inner/Outer Stator Teeth Total | Rotor Teeth | Magnetic Step/Revolution |
|---|---|---|---|---|
| 18 | 5 | 90 | 96 | 288 |
| 18 | 7 | 126 | 120 | 360 |
| 18 | 8 | 144 | 150 | 450 |
| 12 | 5 | 60 | 64 | 192 |
| 12 | 7 | 84 | 80 | 240 |
| 12 | 8 | 96 | 100 | 300 |
| 6 | 5 | 30 | 32 | 96 |
| 6 | 7 | 42 | 40 | 120 |
| 6 | 8 | 48 | 50 | 150 |

The motor according to the invention is designed to be microstepped. This is done by electronically dividing the magnetic steps into smaller substeps. Referring more particularly to FIG. 5, a more or less conventional circuit for driving the motor is schematically illustrated. Each combined winding 30a and 32a, 30b and 32b, 30c and 32c, of given, aligned sets of inner and outer stator poles corresponding to the first, second and third phases, respectively, is connected to the output of a separate one of three digital to analog converters 38a, 38b, 38c, respectively, through power amplifiers. The separate inputs to each of the digital to analog converters are supplied by separate programed read-only memories (PROMs) 40a, 40b, 40c, respectively. The inputs to each of the PROMs are separately addressed in sequence by a counter 42 under the control of a timing logic circuit 44. The counter is supplied with a clock input 48 and a direction input 46, which selectively causes the counter to count up or down.

Each of the PROMs 40a, 40b, and 40c stores a special waveform signal, in digital form, particularly designed for energizing the coils for smooth rotor rotation and constant torque.

In order to operate the motor in the microstep mode, the current in the coils of one phase is reduced in discrete steps, while the current in the coils of the next adjacent phase is increased in discrete steps. This is done simply by the manner in which the PROMs corresponding to the coils in each of the succeeding phases are addressed, i.e. the pattern of the interconnections between the PROMs 40a, 40b and 40c and the outputs of the counters 42. When two adjacent sets of coils are energized, a magnetic flux path, as indicated at 35 in FIG. 4, is generated in which the flux encircles the adjacent poles. The division of the flux between paths 34 and 35 is relative to the amount of electric current flowing through the respective sets of coils.

The terms and expressions which have been employed here are used as terms of description and not of limitation and there is no intention, in the use of such terms and expressions, of excluding equivalents of the features shown and described, or portions thereof, it being recognized that various modifications are possible within the scope of the invention as claimed.

What is claimed is:

1. An improved electric motor of the type having first and second stators having stator poles and a rotor mounted between them, the rotor and the stators each having opposing teeth, and electric coils wrapped about the stator poles for generating a magnetic flux therein and in the rotor which flux brings some segment of the rotor teeth into alignment with the opposed teeth of the magnetically energized stator poles, wherein the improvement comprises:

opposed stator pole pieces on the first and second stators, with the stator teeth projecting from the pole pieces, the rotor teeth project from the surface of the rotor in opposition to the stator pole piece teeth and have the same angular pitch as the opposing stator teeth, and a plurality of coils, a single one of each of said coils encircling a separate one of the stator pole pieces, the coils of opposed pole pieces being connected together as a pair and a plurality of such pairs being connected together to form a single one of a plurality of phases, the coils of each phase being wound on stator pole pieces which as a group have pole piece teeth which are all simultaneously alignable with the opposing rotor teeth, the coils being connected and wound such that when a particular phase is energized, a magnetic flux is generated in each stator pole piece of such phase which flux has a magnetic polarity opposite to the magnetic polarity of the flux generated in the opposed pole piece and in the nearest stator pole piece of the same phase and also opposite to the magnetic polarity of the flux generated in the immediately adjacent pole piece during the preceding energized phase, whereby the rotor teeth align with the stator pole piece teeth of the energized phase and the magnetic flux generated travels only in stators between adjacent stator poles of the energized phase, only travels in the rotor transversely, and only travels through the rotor between opposed poles of the energized phase.

2. A motor as recited in claim 1 wherein the stators and the rotor are cylindrical and the rotor is coaxially positioned between the stators and the difference between the number of rotor teeth and the number of stator teeth facing such rotor teeth is equal to the number of stator poles divided by the number of phases of coils.

3. An electric motor as recited in claim 2 wherein the rotor and the stators are each laminated and the laminations are made of a homogeneous, magnetic material.

4. An electric motor as recited in claim 1 or 2 wherein the coils surrounding every third pair of opposed pole pieces of the first and second stators are connected to be simultaneously energizable.

5. An electric motor as recited in claim 4 wherein the number of stator poles of the first stator, the number of teeth per each such stator pole, and the number of total rotor teeth facing such stator teeth are selected from one of the following combinations:

| First Stator Poles | Teeth/Pole | Total First Stator Pole Teeth | Rotor Teeth |
|---|---|---|---|
| 18 | 5 | 90 | 96 |
| 18 | 7 | 126 | 120 |
| 18 | 8 | 144 | 150 |
| 12 | 5 | 60 | 64 |
| 12 | 7 | 84 | 80 |
| 12 | 8 | 96 | 100 |
| 6 | 5 | 30 | 32 |

-continued

| First Stator Poles | Teeth/Pole | Total First Stator Pole Teeth | Rotor Teeth |
|---|---|---|---|
| 6 | 7 | 42 | 40 |
| 6 | 8 | 48 | 50 |

6. An electric motor as recited in claim 4 wherein the number of stator poles, the number of teeth per pole, and the total number of rotor teeth facing the stator teeth are selected from one of the following combinations:

| Number of Stator Poles | Teeth/Pole | Total Stator Teeth | Rotor Teeth |
|---|---|---|---|
| 18 | 5 | 90 | 96 |
| 18 | 7 | 126 | 120 |
| 18 | 8 | 144 | 150 |
| 12 | 5 | 60 | 64 |
| 12 | 7 | 84 | 80 |

-continued

| Number of Stator Poles | Teeth/Pole | Total Stator Teeth | Rotor Teeth |
|---|---|---|---|
| 12 | 8 | 96 | 100 |
| 6 | 5 | 30 | 32 |
| 6 | 7 | 42 | 40 |

7. An electric motor as recited in claim 1 wherein coil pairs of different phases are connected to be simultaneously, selectively, and proportionately energizable to generate magnetic fields of different strengths and opposite magnetic polarities in adjacent stator pole pieces.

8. An electric motor as recited in claim 1 further comprising means for simultaneously, further comprising means for simultaneously, selectively, and proportionately energizing coil pairs of different phases to generate magnetic fields of different strengths and opposite magnetic polarities in adjacent stator pole pieces.

9. An electric motor as recited in claim 1 wherein the stator poles along each stator are spaced apart from each other by a non-integral multiple of the pitch of the stator teeth.

* * * * *